United States Patent
Isings et al.

(10) Patent No.: US 12,377,792 B2
(45) Date of Patent: Aug. 5, 2025

(54) BRACKET ASSEMBLY FOR MOUNTING A LiDAR SYSTEM TO A VEHICLE

(71) Applicant: Honda Motor Co., Ltd., Tokyo (JP)

(72) Inventors: Connor Isings, Columbus, OH (US); Timothy J Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 18/405,920

(22) Filed: Jan. 5, 2024

(65) Prior Publication Data

US 2025/0222879 A1 Jul. 10, 2025

(51) Int. Cl.
*B60R 11/04* (2006.01)
*G01S 7/481* (2006.01)
*G01S 17/931* (2020.01)
*B60R 11/00* (2006.01)

(52) U.S. Cl.
CPC ............ *B60R 11/04* (2013.01); *G01S 7/4813* (2013.01); *G01S 17/931* (2020.01); *B60R 2011/004* (2013.01); *B60R 2011/0052* (2013.01)

(58) Field of Classification Search
CPC ............... B60R 11/04; B60R 2011/004; B60R 2011/0052; G01S 7/4813; G01S 17/931
See application file for complete search history.

(56) References Cited

U.S. PATENT DOCUMENTS

| | | | |
|---|---|---|---|
| 9,279,437 B2* | 3/2016 | Gold | F16B 5/0216 |
| 10,144,424 B2* | 12/2018 | Hara | G01S 13/931 |
| 10,471,905 B2* | 11/2019 | Ikeno | B60R 11/04 |
| 10,764,988 B2* | 9/2020 | Wada | H04N 23/56 |
| 10,766,430 B2* | 9/2020 | Frederick | B60R 11/00 |
| 11,760,274 B2* | 9/2023 | Higashimachi | B60R 11/04 248/237 |
| 11,815,595 B2* | 11/2023 | Hasegawa | G01S 13/86 |
| 11,820,297 B2* | 11/2023 | Li | F16M 13/02 |
| 12,337,761 B2* | 6/2025 | Jochmann | G06V 20/56 |
| 2021/0364631 A1* | 11/2021 | Hasegawa | G01S 13/86 |
| 2022/0212609 A1 | 7/2022 | Li et al. | |
| 2024/0317139 A1* | 9/2024 | Zhang | G02B 7/182 |
| 2024/0409041 A1* | 12/2024 | Lawler | H04N 23/50 |
| 2025/0130079 A1* | 4/2025 | Robertson, Jr. | G01D 11/30 |
| 2025/0170968 A1* | 5/2025 | Neusatz | B60R 11/00 |

(Continued)

FOREIGN PATENT DOCUMENTS

| | | |
|---|---|---|
| CN | 1873528 B | 5/2010 |
| CN | 205326964 U | 6/2016 |
| CN | 109263568 A | 1/2019 |

(Continued)

*Primary Examiner* — Eret C Mcnichols
(74) *Attorney, Agent, or Firm* — Mark Duell; American Honda Motor Co., Inc.

(57) ABSTRACT

A bracket assembly for housing and mounting a LiDAR system to a roof of a vehicle is disclosed. The bracket assembly a base bracket having a base structure configured to be mounted to the roof of the vehicle, and a datum structure extending substantially perpendicularly to the base structure and configured to extend inside a datum hole of the roof of the vehicle. The datum structure defines an elongated channel extending through the datum structure and having an opening defined at a first surface of the base structure. The bracket assembly also includes a datum pin adapted to extend inside the elongated channel through the opening of the base structure.

20 Claims, 3 Drawing Sheets

(56) References Cited

U.S. PATENT DOCUMENTS

2025/0199263 A1* 6/2025 Song .................. G02B 7/028

FOREIGN PATENT DOCUMENTS

| | | |
|---|---|---|
| CN | 210011692 U | 7/2020 |
| CN | 113103964 A | 7/2021 |
| CN | 214355817 U | 10/2021 |
| CN | 114312589 A | 4/2022 |
| CN | 114506281 A | 5/2022 |
| CN | 112606776 B | 9/2022 |
| CN | 217766833 U | 11/2022 |
| CN | 217879625 U | 11/2022 |
| DE | 102019122186 B4 | 3/2021 |
| KR | 20220145537 A | 10/2022 |
| WO | 2021263280 A1 | 12/2021 |

* cited by examiner

US 12,377,792 B2
// 1

BRACKET ASSEMBLY FOR MOUNTING A LiDAR SYSTEM TO A VEHICLE

BACKGROUND

The disclosed subject matter relates generally to a vehicle. More particularly, the disclosed subject matter relates to a bracket assembly for mounting a LiDAR system to a vehicle for the vehicle that includes single datum pin.

Advanced Driving Assistance System (ADAS) for vehicles, generally, includes LiDAR to assist a driver of the vehicle. However, mounting the LiDAR at a correct orientation is difficult as the LiDAR bracket and the LiDAR sensor of the LiDAR have separate datums. Also, each of the datums has separate seals to prevent intrusion of water making the assembly difficult. This also allows for more locations for water to enter the cabin.

SUMMARY

In accordance with one embodiment of the present disclosure, a bracket assembly for housing and mounting a LiDAR system to a roof of a vehicle is disclosed. The bracket assembly a base bracket having a base structure configured to be mounted to the roof of the vehicle, and a datum structure extending substantially perpendicularly to the base structure and configured to extend inside a datum hole of the roof of the vehicle. The datum structure defines an elongated channel extending through the datum structure and having an opening defined at a first surface of the base structure. The bracket assembly also includes a datum pin adapted to extend inside the elongated channel through the opening of the base structure.

In accordance with another embodiment of the present disclosure, a LiDAR assembly for a vehicle is disclosed. The vehicle includes a roof defining a datum hole. The LiDAR assembly comprises a LiDAR system including at least one LiDAR sensor, and a base bracket comprising having a base structure configured to be mounted to the roof of the vehicle. The base bracket further includes a datum structure extending substantially perpendicularly to the base structure and configured to extend inside a datum hole of the roof of the vehicle. The datum structure defines an elongated channel extending through the datum structure and having an opening defined at a first surface of the base structure. The LiDAR assembly further includes a datum pin adapted to extend inside the elongated channel through the opening of the base structure.

In accordance with yet a further embodiment of the present disclosure a vehicle is disclosed. The vehicle includes a roof defining a datum hole, and a LiDAR system having at least one LiDAR sensor mounted to the roof. The vehicle further includes a base bracket having a base structure mounted to the roof of the vehicle, and a datum structure extending substantially perpendicularly to the base structure and extending inside the datum hole of the roof of the vehicle. The datum structure defines an elongated channel extending through the datum structure and having an opening defined at a first surface of the base structure. Moreover, the vehicle includes a datum pin extending inside the elongated channel through the opening of the base structure.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-3, wherein like numbers indicate the same or corresponding elements throughout the views.

Figure 1:
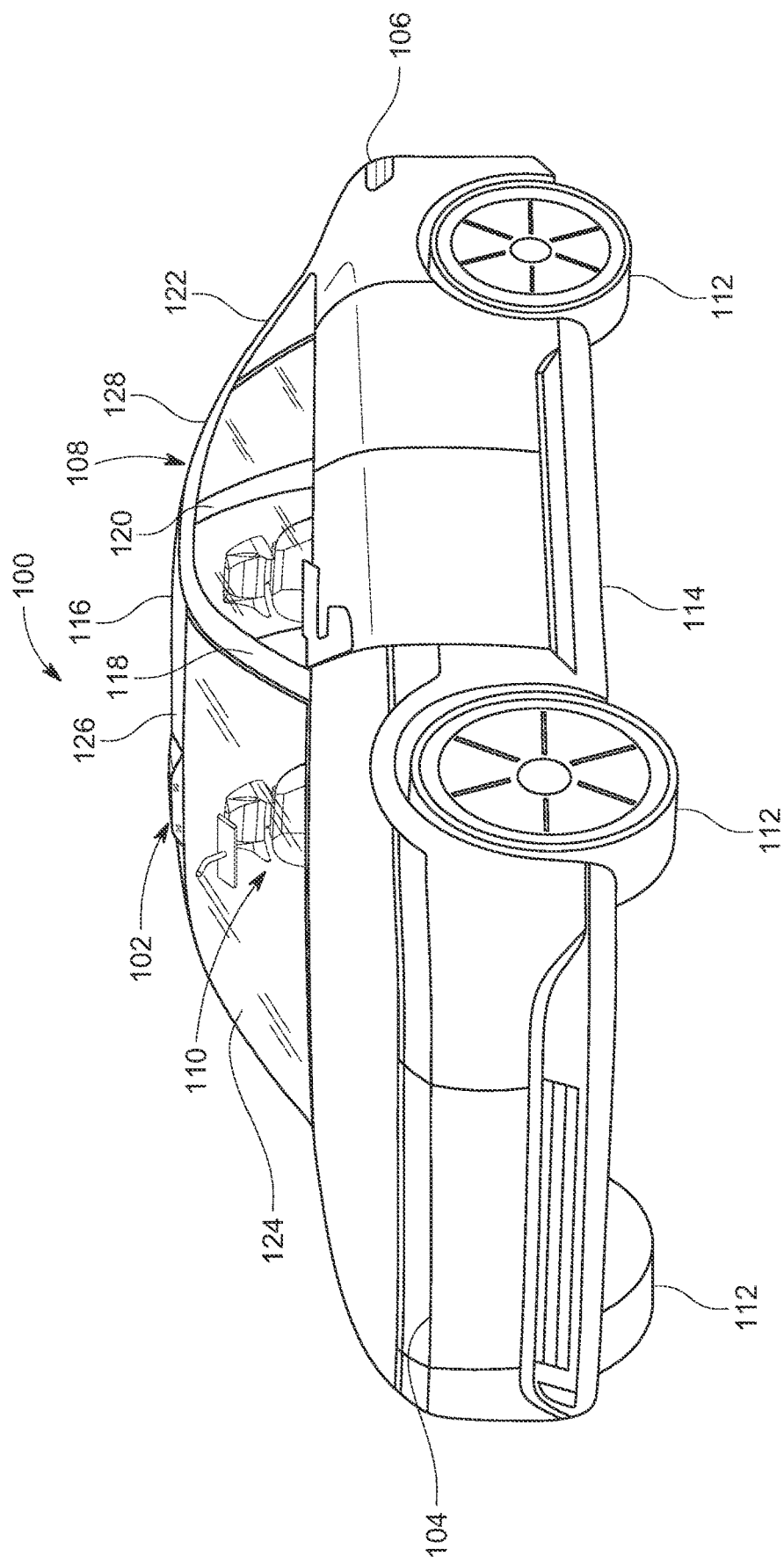
FIG. 1 is a perspective view of a vehicle having a LiDAR assembly mounted to a roof to the vehicle, in accordance with one embodiment of the present disclosure.

FIG. 1 illustrates a perspective view of a vehicle 100 having a LiDAR (light detection and ranging) assembly 102 for detecting obstacles along a travel path of the vehicle 100, in accordance with one embodiment of the present disclosure. As shown, the vehicle 100 includes a front end 104, a rear end 106, and a vehicle body 108 extending from the front end 104 to the rear end 106 and defining a passenger compartment 110 for facilitating a seating of one or more passenger inside the vehicle 100. Further, the vehicle 100 includes a plurality of wheels 112 supporting the vehicle body 108 on a surface and enables a movement of the vehicle 100 over the surface. As shown, the vehicle body 108 includes a floor 114 on which one or more seats are mounted and a roof 116 arranged opposite to the floor 114 and supported on a plurality of pillars, for example, A-pillars 118, B-pillars 120, and C-pillars 122 of the vehicle body 108. Further, the vehicle 100 includes a front windshield 124 arranged between the A-pillars 118 and the roof 116 of the vehicle 100. Further, the roof 116 includes a first roof portion 126 arranged proximately to the front windshield 124 and extending rearwardly from the front windshield 124, and a second roof portion 128 that extends rearwardly of the first roof portion 126 towards a rear windshield (not shown) of the vehicle 100. The second roof portion 128 may include a sunroof portion of the vehicle 100. The first roof portion 126 provides a support structure for the LiDAR assembly 102 and the LiDAR assembly 102 is mounted to the first roof portion 126. Further, the first roof portion 126 defines a datum hole 130 to facilitate the mounting of the LiDAR assembly 102 on the roof 116 in a correct orientation.

Figure 2:
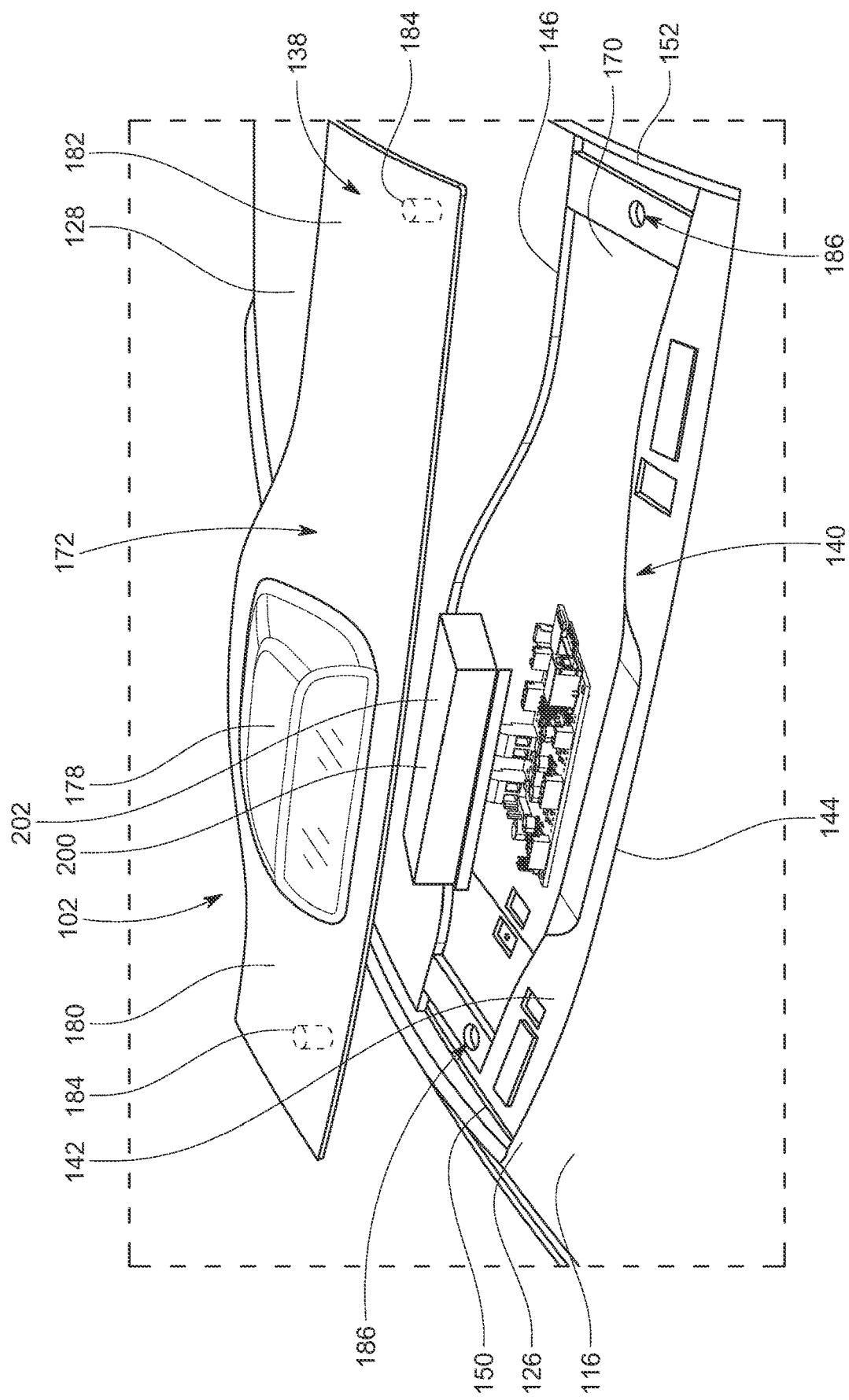
FIG. 2 is an exploded view of the LiDAR assembly of FIG. 1 having a base structure mounted to the roof of the vehicle, in accordance with one embodiment of the present disclosure.
Figure 3:
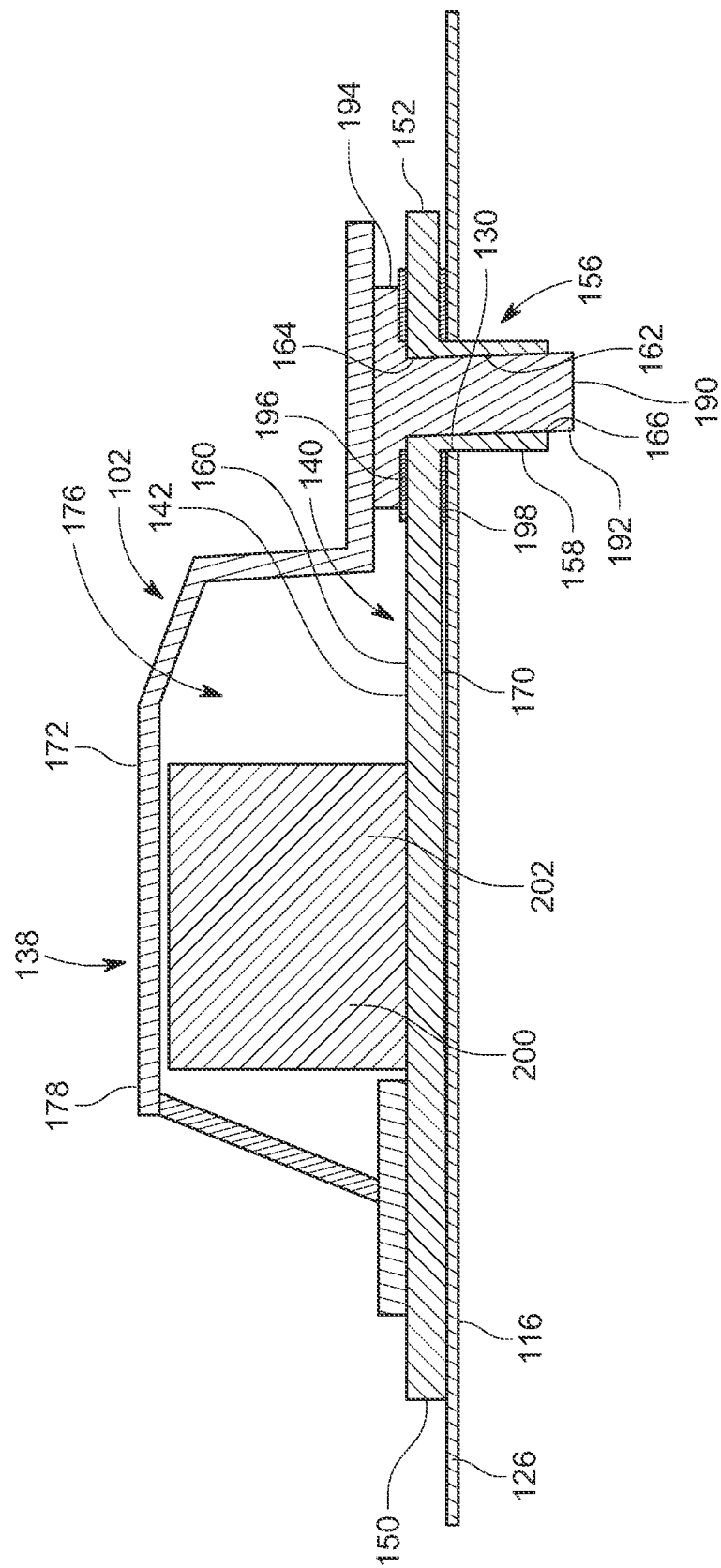
FIG. 3 is a sectional view of the LiDAR assembly mounted to the vehicle, in accordance with one embodiment of the present disclosure.

As shown in FIGS. 2 and 3, the LiDAR assembly 102 a LiDAR system 200 having at least one LiDAR sensor 202 and a bracket assembly 138 to mount the LiDAR system 200 on the roof 116 of the vehicle 100. As shown, the bracket assembly 138 includes a base bracket 140 mounted to the first roof portion 126 and includes a base structure 142 arranged covering the first roof portion 126 and mounted to the first roof portion 126. The base structure 142 includes a front edge 144 arranged proximate to the front windshield 124, a rear edge 146 arranged spaced apart and opposite to the front edge 144, and two side edges 150, 152 extending along longitudinal sides of the roof 116. Further, the base bracket 140 includes a datum structure 156 having a substantially cylindrical wall 158 and extending substantially perpendicularly to a first surface 160 of the base structure 142. The cylindrical wall 158 defines an elongated channel 162 having a first opening 164 defined at the first surface 160 of the base structure 142 and a second opening 166 arranged distally from the base structure 142 and arranged at a free end of the wall 158. The first opening 164 extends through a thickness of the base structure 142 from the first surface 160 to a second surface 170 of the base structure 142. As shown, the second surface 170 is arranged abutting the first roof portion 126, while the first surface 160 is arranged opposite to the second surface 170. As shown, the datum structure 156 is arranged proximate to the rear edge 146 of the base structure 142 and is located substantially centrally to the rear edge 146. The datum structure 156 (i.e., wall 158) extends inside the datum hole 130 in an assembly of the base bracket 140 with the first roof portion 126.

Further, the bracket assembly 138 includes a garnish bracket 172 coupled to the base bracket 140 and arranged facing the first surface 160 of the base structure 142 and defines a chamber 176 therebetween. As shown in FIG. 2, the garnish bracket 172 includes a central structure 178 that protrudes upwardly of a pair of side structures 180, 182 of the garnish bracket 172 and defines the chamber 176. The LiDAR system 200 is arranged inside the chamber 176. Also, the pair of side structures 180, 182 extend on opposite sides of the central structure 178 and arranged abutting the base bracket 140 i.e., the base structure 142 and are coupled to the base bracket 140. To facilitate the engagement of the garnish bracket 172 with the base bracket 140 i.e., the base structure 142, the garnish bracket 172 includes a pair of engagement structures, for example, protrusions 184, extending downwardly of the pair of side structures 180, 182, while the base bracket 140 includes a pair of mounting structures, for example, a pair of grooves 186, engaged with the pair of engagement structures. Accordingly, in an assembly of the garnish bracket 172 with the base bracket 140, the protrusions 184 of the garnish bracket 172 extend inside the grooves 186 of the base bracket 140. Moreover, the bracket assembly 138 includes a datum pin 190 (shown in FIG. 3) having a cylindrical structure 192 removably extending inside the elongated channel 162 of the datum structure 156 and a flange structure 194 arranged outwardly of the elongated channel 162 and between the base bracket 140 and the garnish bracket 172. Due to presence of single datum structure 156 and associated single datum hole 130, the assembly of the LIDAR Assembly with the roof 116 is achieved relatively easily.

Further, referring to FIG. 3, to prevent an ingress of water inside the elongated channel 162 and the datum hole 130, the bracket assembly 138 includes a first seal 196 arranged between the base structure 142 and the garnish bracket 172 and a second seal 198 arranged between the base structure 142 and the first roof portion 126. As shown, the first seal 196 is sandwiched between the flange structure 194 of the datum pin 190 and the base structure 142 and extends circularly around the first opening 164. Accordingly, the first seal 196 prevents the ingress of water inside the elongated channel 162 and the datum hole 130, and hence the passenger compartment 110, from any gap that exists between the base structure 142 and the garnish bracket 172. Similarly, the second seal 198 is arranged circularly around the cylindrical wall 158 and is sandwiched between the roof 116 and the base structure 142. Accordingly, the second seal 198 prevents ingress of water inside the datum hole 130 through any gap between the roof 116 and the base structure 142. In an embodiment, the first seal 196 and/or the second seal 198 may be integral with the base bracket 140 (i.e., the base structure 142). In some embodiments, the first seal 196 and/or the second seal 198 may be injection molded with the base structure 142. Alternatively, the first seal 196 and/or the second seal 198 may be separate from the base bracket 140 (i.e., the base structure 142) and are arranged at the suitable locations during assembly of the bracket assembly 138 with the roof 116.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A bracket assembly for housing and mounting a LiDAR system to a roof of a vehicle, the bracket assembly comprising:
    a base bracket, comprising:
        a base structure configured to be mounted to the roof of the vehicle, and
        a datum structure extending substantially perpendicularly to the base structure and configured to extend inside a datum hole of the roof of the vehicle, wherein the datum structure defines an elongated channel extending through the datum structure and having an opening defined at a first surface of the base structure; and
    a datum pin adapted to extend inside the elongated channel through the opening of the base structure.

2. The bracket assembly of claim 1 further comprising a garnish bracket adapted to be removably engaged with the base bracket and defining a chamber therebetween to house the LiDAR system.

3. The bracket assembly of claim 2 further comprising:
    a first seal adapted to be arranged between the base structure and the garnish bracket and extending around the opening; and
    a second seal adapted to be arranged between the base structure and the roof and extending around the datum structure.

4. The bracket assembly of claim 3 wherein the first seal and the second seal are integral to the base structure.

5. The bracket assembly of claim 1 wherein the datum structure is arranged substantially centrally to the base structure in a longitudinal direction and is disposed proximate to a rear edge of the base structure.

6. The bracket assembly of claim 1 wherein the base bracket includes a plurality of mounting structures adapted to mount the base bracket to the roof of the vehicle.

7. A LIDAR assembly for a vehicle including a roof defining a datum hole, the LiDAR assembly comprising:
    a LiDAR system including at least one LiDAR sensor;
    a base bracket comprising:
        a base structure configured to be mounted to the roof the vehicle; and a datum structure extending substantially perpendicularly to the base structure and configured to extend inside a datum hole of the roof of the vehicle, wherein the datum structure defines an elongated channel extending through the datum structure and having an opening defined at a first surface of the base structure; and a datum pin adapted to extend inside the elongated channel through the opening of the base structure.

8. Th LiDAR assembly of claim 7 further comprising a garnish bracket adapted to be removably engaged with the base bracket and defining a chamber therebetween to house the LiDAR system.

9. The LiDAR assembly of claim 8 further comprising:

a first seal adapted to be arranged between the base structure and the garnish bracket and extending around the opening, and a second seal adapted to be arranged between the base structure and the roof and extending around the datum structure.

10. The LiDAR assembly of claim 9 wherein the first seal and the second seal are integral to the base structure.

11. The LiDAR assembly of claim 7 wherein the datum structure is arranged substantially centrally to the base structure in a longitudinal direction and is disposed proximate to a rear edge of the base structure.

12. The LiDAR assembly of claim 7 wherein the base bracket includes a plurality of mounting structures adapted to mount the base bracket to the roof of the vehicle.

13. A vehicle, comprising:

a roof defining a datum hole;

a LiDAR system including at least one LiDAR sensor mounted to the roof;

a base bracket comprising:

a base structure mounted to the roof of the vehicle, and a datum structure extending substantially perpendicularly to the base structure and extending inside the datum hole of the roof of the vehicle, wherein the datum structure defines an elongated channel extending through the datum structure and having an opening defined at a first surface of the base structure; and a datum pin extending inside the elongated channel through the opening of the base structure.

14. The vehicle of claim 13 further comprising a garnish bracket removably engaged with the base bracket and defining a chamber therebetween, wherein the LiDAR sensor is arranged inside the chamber.

15. The vehicle of claim 14 further comprising a first seal arranged between the base structure and the garnish bracket and extending around the opening, and a second seal arranged between the base structure and the roof and extending around the datum structure.

16. The vehicle of claim 15 wherein the first seal and the second seal are integral to the base structure.

17. The vehicle of claim 13 wherein the datum structure is arranged substantially centrally to the base structure in a longitudinal direction and is disposed proximate to a rear edge of the base structure.

18. The vehicle of claim 13 wherein the base bracket includes a plurality of mounting structures mounting the base bracket to the roof of the vehicle.

19. The vehicle of claim 13 further including a pair of A-pillars and the base bracket is arranged proximate to the pair of A-pillars.

20. The vehicle of claim 19 wherein the roof includes a sunroof portion and the base bracket is arranged between the pair of A-pillars and the sunroof portion.

* * * * *